(12) United States Patent
Baker et al.

(10) Patent No.: US 10,232,497 B2
(45) Date of Patent: Mar. 19, 2019

(54) POWER TOOL FOR TIGHTENING A FASTENER AND A METHOD

(71) Applicant: ATLAS COPCO INDUSTRIAL TECHNIQUE AB, Stockholm (SE)

(72) Inventors: Erik George Baker, Täby (SE); Erik Vilhelm Persson, Solna (SE); Kristoffer Felix Wadman, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 237 days.

(21) Appl. No.: 15/106,149

(22) PCT Filed: Dec. 19, 2014

(86) PCT No.: PCT/EP2014/078810
§ 371 (c)(1),
(2) Date: Jun. 17, 2016

(87) PCT Pub. No.: WO2015/091987
PCT Pub. Date: Jun. 25, 2015

(65) Prior Publication Data
US 2016/0318164 A1 Nov. 3, 2016

(30) Foreign Application Priority Data
Dec. 20, 2013 (SE) ........................ 1351567

(51) Int. Cl.
*B25B 21/02* (2006.01)
*B23P 19/06* (2006.01)
(Continued)

(52) U.S. Cl.
CPC ............ *B25B 23/14* (2013.01); *B23P 19/066* (2013.01); *B25B 21/00* (2013.01)

(58) Field of Classification Search
CPC ....... B23P 19/066; B25B 21/00; B25B 23/14; B25B 23/147–23/1475
(Continued)

(56) References Cited

U.S. PATENT DOCUMENTS

| 2010/0206598 A1 | 8/2010 | Elsmark et al. |
| 2013/0068491 A1 | 3/2013 | Kusakawa et al. |
| 2014/0090224 A1* | 4/2014 | Khalaf ............ G05D 17/02 29/407.02 |

FOREIGN PATENT DOCUMENTS

| EP | 0271902 A2 | 6/1988 |
| EP | 2572831 A2 | 3/2013 |
| WO | 2009011633 A1 | 1/2009 |

OTHER PUBLICATIONS

International Search Report (ISR), Written Opinion (WO) and International Preliminary Report on Patentability (IPRP) dated Mar. 19, 2015 issued in International Application No. PCT/EP2014/078810.

* cited by examiner

*Primary Examiner* — Matthew P Travers
(74) *Attorney, Agent, or Firm* — Holtz, Holtz & Volek PC

(57) ABSTRACT

A power tool for tightening a fastener includes: an angle measurement unit for measuring a rotational angle ($\alpha$) of the fastener; a torque measurement unit for measuring a torque (T) delivered to the fastener during tightening; a motor connected to rotatable parts of the power tool for driving the tightening of the fastener; a processor for calculating a tightening energy ($E_t$) needed to complete tightening of the fastener from $\alpha$ to a predetermined target angle ($\alpha_t$), wherein $E_t$ is calculated based on $\alpha$, $\alpha_t$ and a stiffness (k) of a joint; and a regulator to regulate a rotational speed ($\omega$) of the motor to provide rotational energy ($E_r$) in the form of rotational inertia in the rotatable parts of the power tool to (Continued)

Figure 1:
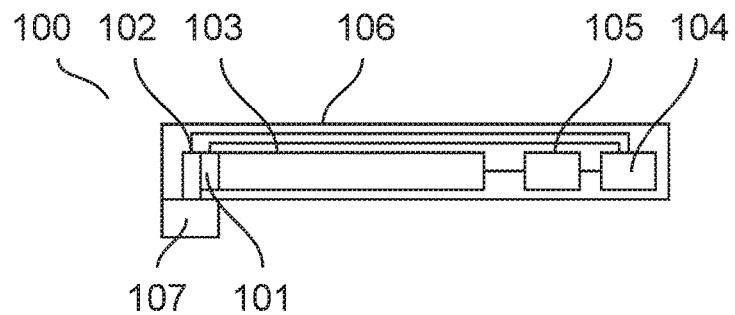

meet the needed $E_t$, wherein the power tool interrupts the tightening of the fastener at $\alpha_t$, $\alpha_t$ defined from snug, at a snug angle ($\alpha_0$).

9 Claims, 2 Drawing Sheets

(51) Int. Cl.
*B25B 23/147* (2006.01)
*B25F 5/00* (2006.01)
*B25B 23/14* (2006.01)
*B25B 21/00* (2006.01)

(58) Field of Classification Search
USPC .................. 173/1, 2, 176, 181, 182, 183
See application file for complete search history.

POWER TOOL FOR TIGHTENING A FASTENER AND A METHOD

The invention generally relates to a power tool for tightening a fastener, and to a method of tightening a fastener.

BACKGROUND

Fasteners are used to form joints in e.g. different assembly processes, wherein power tools may be used to tighten such fasteners. In general it is desirable to increase the speed and accuracy in the tightening of fasteners. Another important aspect is to improve the ergonomics during operation of the power tool.

Previously, fasteners have usually been tightened to a predetermined torque without any consideration to the energy used during the process of tightening. In order to increase the tightening accuracy the speed had to be decreased during the final step of tightening after snug. Thereby the reaction forces exerted on an operator may be relatively high.

To reduce this problem, WO 2009/011633 A1 discloses a regulator for a power tool wherein the fastener of a joint is tightened to a predetermined target torque. The regulator is arranged to calculate the amount of energy which is needed to reach the predetermined target torque. Thus a high speed may be used during tightening, thereby reducing the reaction forces exerted on an operator of the tool.

However, during tightening of fasteners there may be variations in friction between different joints, which may affect the torque needed to tighten the joint. Thus, when controlling the tightening based on a target torque, there may be variations in the clamp force due to these friction variations.

Further to this, when using high rotational speeds to provide the rotational energy needed for ergonomically favourable tightening of fasteners, heat may be generated in an interface between rotating and stationary parts of the joint. Due to this, the coefficient of friction in the interface may be affected. Thus, when controlling the torque to reach a predetermined target torque there may be a variation in the final angle depending on geometrical factors of the joint, in combination with such variations in friction. Thus the resulting clamp force, being a very important quality factor of the joint, may vary based on these factors.

Variations in friction in the interface may e.g. be reduced by reducing the rotational speed during tightening, but this is disadvantageous since it decreases the tightening speed and may result in the operator being subjected to higher reaction forces.

SUMMARY OF THE INVENTION

An object of the present invention is to provide a fast and ergonomically favourable tightening of a fastener while reducing effects of friction on the clamping force and maintaining a high accuracy in clamp force.

Thus the invention relates to a power tool for tightening a fastener comprising an angle measurement means for measuring a rotational angle ($\alpha$) of the fastener and a torque measurement means for measuring the torque (T) delivered to the fastener during tightening. A motor is connected to rotatable parts of the power tool for driving the tightening of the fastener. The tool further comprises or is connected to a means for calculating a tightening energy ($E_t$) needed to complete tightening of the fastener from the measured rotational angle to a predetermined target angle. The tightening energy is calculated based on the measured rotational angle ($\alpha$), target angle and the stiffness (k) of the joint. A regulator is connected to the motor to regulate the rotational speed ($\omega$) of the motor to provide rotational energy ($E_r$) in the form of rotational inertia in the rotatable parts of the power tool to meet the needed tightening energy ($E_t$).

Thereby fast and ergonomically favourable tightening of a fastener may be achieved while reducing effects of friction on the clamping force and thus maintaining a high accuracy. A high tightening speed may be used during a longer period of time during tightening, and may be maintained over snug.

The stiffness (k) of the joint may be defined as the torque rate per angle of rotation of the fastener, $k=\Delta T/\Delta \alpha$.

The regulator may be arranged to continuously or intermittently regulate the speed ($\omega$) of the motor during tightening.

Thereby the regulation of the rotational speed may be dynamically updated during the tightening to take into account variations and deviations from e.g. a linear behaviour.

The regulator connected to the motor to regulate the rotational speed ($\omega$) of the motor may be a cascade regulator, e.g. comprising a speed regulator for regulating speed connected to a current regulator for regulating the drive current to the motor, in order to control the rotational speed.

The tightening energy ($E_t$) needed to complete tightening of the fastener may be estimated as $$E_t = k(\alpha_t^2 - \alpha^2)/2$$

wherein k is the torque rate (stiffness of the joint), $\alpha_t$ is the target angle and $\alpha$ is the actual measured angle.

Thereby a linear approximation is used to calculate the tightening energy needed.

The rotational energy ($E_r$) in rotational parts of the tool, connected to the motor, may be described as $$E_r = J\omega^2/2$$

wherein $\omega$ is the rotational speed and J is the moment of inertia of rotating parts in the power tool.

The rotational speed ($\omega$) needed to provide rotational energy ($E_r$) in the form of rotational inertia in the rotatable parts of the power tool to meet the needed tightening energy ($E_t$) may thus be calculated as $$\omega = \mathrm{SQRT}(k(\alpha_t^2 - \alpha^2)/J)$$

wherein $\omega$ is the rotational speed, the square root, k is the torque rate (stiffness of the joint), $\alpha_t$ is the target angle, $\alpha$ is the actual measured angle and J is the moment of inertia of rotating parts in the power tool. The moment of inertia of rotating parts in the power tool may be measured or calculated for a particular power tool.

The rotational speed may be maintained at a high level until the needed tightening energy is less than the rotational energy ($E_r$) in the form of rotational inertia in the rotatable parts of the power tool. Thereby fast and ergonomically favourable tightening of a fastener may be achieved The power tool may be configured to interrupt the tightening at the predetermined target angle of rotation of the fastener.

The target angle and the measured angle may be defined from snug at a snug angle $\alpha_0$, i.e. defining zero angle.

Thereby the stiffness of the joint may be estimated by a linear torque rate from snug, and the calculation of the tightening energy tray be made based on this torque rate.

The term before snug may be defined as at an angle below the snug angle, and the term after snug may be defined as at an angle larger than the snug angle.

There are some alternative ways of defining the snug angle. Snug may e.g. be defined by a torque threshold. As an alternative, snug may be defined by a knee in the torque-angle relationship. The snug angle may defined as a linear projected angle $\alpha_1$ along the torque-angle relationship above snug corresponding to zero torque in the torque-angle relationship. Alternatively the snug angle may be defined as the angle $\alpha_2$ of crossing of linear approximations of the torque-angle relationship before and after snug.

The target angle is predetermined in relation to a particular fastener and conditions of the joint.

The target angle may be one or more turns of rotation of the fastener and/or part of turns. The target angle may be at least 10, 30, 50, 70, 90, 120 degrees, and/or less than 150, 180, 210, 270, 360, 720 degrees or more, from snug.

The invention further relates to a power tool assembly, comprising a power tool, a means for calculating the tightening energy ($E_t$) and a regulator as disclosed herein.

The invention further relates to a method of tightening a fastener comprising the steps of
  measuring an angle of rotation of the fastener,
  measuring torque delivered to the fastener,
  calculating a tightening energy ($E_t$) needed to complete tightening of the fastener from the measured rotational angle to a predetermined target angle, wherein the tightening energy is calculated based on the measured rotational angle $\alpha$ and the stiffness (k) of the joint,
  regulating the rotational speed ($\omega$) of the motor to provide rotational energy ($E_r$) in the form of rotational inertia in the rotatable parts of the power tool to meet the needed tightening energy ($E_t$),
  tightening the fastener by means of the provided rotational energy.

The method steps may be continuously or intermittently iterated during tightening.

Thereby fast and ergonomically favourable tightening of a fastener may be achieved while reducing effects of friction on the clamping force and maintaining a high accuracy.

Other features and advantages of the invention will be apparent from the figures and from the detailed description of the shown embodiment(s).

SHORT DESCRIPTION OF THE DRAWINGS

Figure 2:
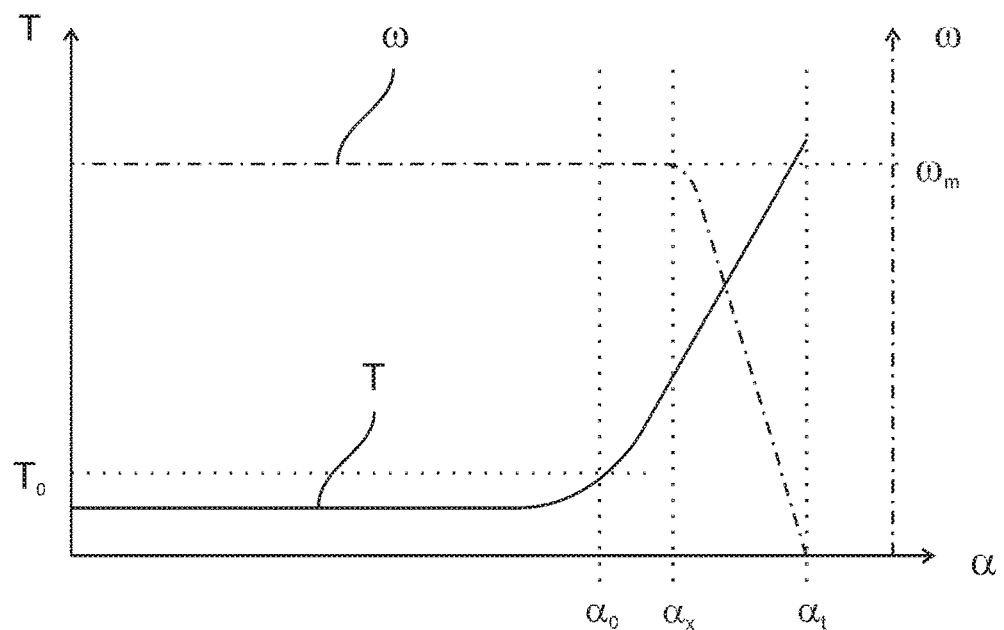
Figure 3:
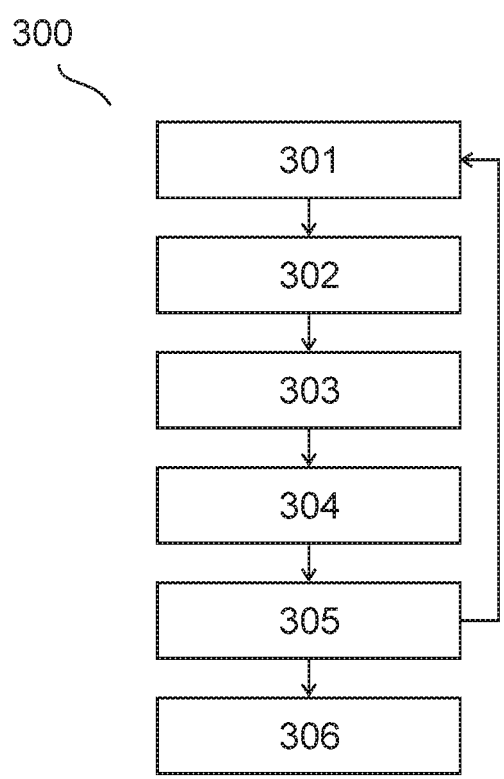

In the following detailed description reference is made to the accompanying drawings, of which:
  FIG. 1 shows an example of a power tool.
  FIG. 2 shows a torque-angle and rotational-angle graph.
  FIG. 3 shows an example of a method of tightening a fastener.

DETAILED DESCRIPTION OF THE SHOWN EMBODIMENT OF THE INVENTION

FIG. 1 shows a power tool 100 for tightening fasteners. In the shown embodiment the power tool is an angle tensioner, but the invention also relates to pistol type tensioner or straight tensioners. The tool comprises a body 106 to be held by an operator or by a fixture. A tool head 107 connected to the body is configured to receive a fastener for tightening by the tool. A motor 103 is connected to rotatable parts of the power tool for driving the tool head and thus for tightening the fastener. The rotatable parts may comprise rotatable parts of the motor itself, shafts, gears etc., i.e. the combined, mass being rotated in the power tool during tightening. These rotatable parts have a combined rotational inertia J, which may be calculated or measured for a particular tool.

The tool comprises an angle measurement means 101 for measuring a rotational angle $\alpha$ of the fastener. The angle measurement means may be an angular encoder.

Further, a torque measurement means 102, e.g. a torque sensor, is arranged for measuring the torque T delivered to the fastener during tightening. In the shown embodiment the torque measurement means is arranged between the motor 103 and the tool head 107 of the power tool. It may however be arranged anywhere along the drive line and may also be arranged to measure the reaction torque in the tool.

The tool comprises a processing unit 104. As an alternative the processing unit is comprised by a separate driver configured to drive the tool, connected to the power tool. The driver may be electrically connected to the tool by wire, or wireless connected to the tool. The processing unit is connected to the angle measurement means 101 and the torque measurement 102 means to receive measurements on rotation angle and torque. The processing unit 104 is configured to calculate the tightening energy $E_t$ needed to complete tightening of the fastener from the measured rotational angle to a predetermined target angle. The tightening energy $E_t$ is calculated as $$E_t = k(\alpha_t^2 - \alpha^2)/2$$

wherein k is the torque rate per angle (stiffness of the joint, $k=\Delta T/\Delta\alpha$), $\alpha_t$ is the target angle and $\alpha$ is the actual measured angle. Thus the tightening energy is calculated based on the measured rotational angle $\alpha$, the target angle and the stiffness k of the joint.

The processing unit 104 is further configured to calculate a rotational speed $\omega$ of the motor to provide an amount of rotational energy $E_r$ in the power tool, in the form of rotational inertia in the rotatable parts of the tool, to meet the needed tightening energy $E_t$. The rotational energy $E_r$ in rotational parts of the tool, connected to the motor, is calculated as $$E_r = J\omega^2/2$$

wherein $\omega$ is the rotational speed and J is the moment of inertia of rotating parts in the power tool.

By equating the tightening energy $E_t$ with the rotational energy $E_r$, the rotational speed $\omega$ needed may thus be calculated as $$\omega = \text{SQRT}(k(\alpha_t^2 - \alpha^2)/J.$$

If the rotational speed needed to meet the tightening energy $E_t$ is higher than the maximum rotational speed $\omega_m$ of the tool, the rotational speed $\omega$ of the motor may be limited to a maximum rotational speed $\omega_m$.

The power tool further comprises a regulator 105 to regulate the rotational speed of the motor 103. The regulator as arranged to regulate the speed to the calculated rotational speed $\omega$, limited by the maximum rotational speed $\omega_m$. Alternatively the regulator is comprised by a driver connected to the tool and configured to control the tool. Thereby measurements on torque and rotational angle may be transmitted to the driver wherein the rotational speed $\omega$ is calculated as disclosed herein, and control signals for regulating the motor are transmitted back to the motor in the power tool.

The operation of the power tool is illustrated in FIG. 2, showing a graph of a torque-angle relationship during tightening, and including the rotational speed $\omega$.

Initially, at a low rotational angle, the torque T measured by the torque measurement means is low, below a threshold $T_0$. This is the run-down phase, where the actual tightening of the fastener has not yet begun. At the end of the run-down phase the torque starts to increase, which may be seen as a knee in the torque-angle relationship. This is defined as "snug", at snug angle $\alpha_0$ (defining zero angle in the calculations). The snug angle may be detected by a threshold level $T_0$ of the torque. As an alternative, snug may be defined by detecting a knee in the torque-angle relationship, i.e. by monitoring the gradient of the torque-angle relationship.

Above the snug level, the torque increases while rotating the fastener, indicated by a torque rate $k=\Delta T/\Delta\alpha$. k may either be calculated during a tightening or may be known for a specific fastener in specific conditions. In this phase the rotational speed is calculated by equating the tightening energy $E_t$ with the rotational energy $E_r$ as described above. Initially (as shown in FIG. 2) the rotational speed may be limited by the maximum rotational speed $\omega_m$ but, as the tightening proceeds, at an angle $\alpha_x$ the rotational energy in the tool is estimated to be able to complete the tightening to the target angle $\alpha_t$. Thereafter the rotational speed is continuously reduced by rotational energy being used to tighten the fastener. The calculation is frequently updated as the tightening proceeds, e.g. at a frequency of 4 kHz, to dynamically regulate the speed of rotation to take into account non-linear effects in the fastening system.

As the fastener is rotated towards the target angle $\alpha_t$, the rotational speed continuously decreases, ideally to reach zero at the target angle $\alpha_t$. Thereafter the tightening is discontinued. Thereby, the rotational speed during fastening may be kept at a maximum level until the rotational energy in the tool is sufficient to complete the tighening to the target angle $\alpha_t$. The tightening is therefore fast and the effects of reaction forces on the power tool are reduced, improving the ergonomics of the tool. The quality of the tightening is further improved by reducing effects of friction on the tightening result. Therefore the accuracy in clamp force is improved.

The operation of the power tool is further described in relation to FIG. 3, showing the method steps of a method 300 of tightening a fastener. The method comprising the steps of measuring 301 an angle of rotation of the fastener, and measuring 302 the torque delivered to the fastener. The tightening energy $E_t$ needed to complete tightening of the fastener from the measured rotational angle to a predetermined target angle is calculated 303. The tightening energy is calculated as disclosed above, based on the measured rotational angle $\alpha$ and the stiffness k of the joint. The rotational speed $\omega$ of the motor is regulated 304 to provide rotational energy ($E_r$) in the form of rotational inertia in the rotatable parts of the power tool to meet the needed tightening energy ($E_t$). The tightening 305 of the fastener is completed by means of the provided rotational energy. The process is continuously iterated during the tightening of the fastener. The tightening is interrupted 306 at the predetermined target angle of rotation of the fastener.

The invention claimed is:

1. A power tool for tightening a fastener, the power tool comprising:
   an angle measurement unit for measuring a rotational angle (a) of the fastener;
   a torque measurement unit for measuring a torque (T) delivered to the fastener during tightening;
   a motor connected to rotatable parts of the power tool for driving the tightening of the fastener;
   a processor for calculating a tightening energy ($E_t$) needed to complete tightening of the fastener from the measured rotational angle ($\alpha$) to a predetermined target angle ($\alpha_t$), wherein the tightening energy ($E_t$) is calculated based on the measured rotational angle ($\alpha$), the target angle ($\alpha_t$) and a stiffness (k) of a joint; and
   a regulator connected to the motor to regulate a rotational speed ($\omega$) of the motor to provide rotational energy ($E_r$) in the form of rotational inertia in the rotatable parts of the power tool to meet the needed tightening energy ($E_t$),
   wherein the rotational speed ($\omega$) of the motor is maintained after snug at a rotational speed ($\omega$) of the motor before snug, until the needed tightening energy ($E_t$) is less than the rotational energy ($E_r$) in the form of rotational inertia in the rotatable parts of the power tool, and
   wherein the power tool is configured to interrupt the tightening of the fastener at the predetermined target angle ($\alpha_t$), the target angle ($\alpha_t$) defined from snug, at a snug angle ($\alpha_0$).

2. The power tool according to claim 1, wherein the stiffness (k) of the joint is calculated from the measured torque (T) and rotational angle ($\alpha$), as a torque rate per angle of rotation of the fastener, $k=\Delta T/\Delta\alpha$.

3. The power tool according to claim 1, wherein the regulator continuously or intermittently regulates the rotational speed ($\omega$) of the motor during tightening.

4. The power tool according to claim 1, wherein the rotational speed ($\omega$) of the motor needed to provide rotational energy ($E_r$) in the form of rotational inertia (J) in the rotatable parts of the power tool to meet the needed tightening energy ($E_t$) is calculated as $\omega=\mathrm{SQRT}(k(\alpha_t^2-\alpha^2)/J)$.

5. A method of tightening a fastener comprising the steps of:
   measuring a rotational angle ($\alpha$) of the fastener;
   measuring a torque (T) delivered to the fastener;
   calculating a tightening energy ($E_t$) needed to complete tightening of the fastener from the measured rotational angle ($\alpha$) to a predetermined target angle ($\alpha_t$), wherein the tightening energy ($E_t$) is calculated based on the measured rotational angle ($\alpha$) and a stiffness (k) of a joint;
   regulating a rotational speed ($\omega$) of a motor to provide rotational energy ($E_r$) in the form of rotational inertia (J) in rotatable parts of the power tool to meet the needed tightening energy ($E_t$);
   tightening the fastener by the provided rotational energy ($E_r$); and
   interrupting the tightening of the fastener at the predetermined target angle ($\alpha_t$), the target angle ($\alpha_t$) defined from snug, at a snug angle ($\alpha_0$),
   wherein the rotational speed ($\omega$) of the motor is maintained after snug at a rotational speed ($\omega$) of the motor before snug, until the needed tightening energy ($E_t$) is less than the rotational energy ($E_r$) in the form of rotational inertia (J) in the rotatable parts of the power tool.

6. The method according to claim 5, wherein the stiffness (k) of the joint is calculated from the measured torque (T) and rotational angle ($\alpha$), as a torque rate per angle of rotation of the fastener, $k=\Delta T/\Delta\alpha$.

7. The method according to claim 5, wherein the rotational speed ($\omega$) of the motor is continuously or intermittently regulated during tightening.

8. The method according to claim 5, wherein the rotational speed ($\omega$) of the motor needed to provide rotational energy ($E_r$) in the form of rotational inertia (J) in the rotatable parts of the power tool to meet the needed tightening energy ($E_t$) is calculated as $\omega=\mathrm{SQRT}(k(\alpha_t^2-\alpha^2)/J)$.

9. The method according to claim 5, wherein the tightening energy ($E_t$) needed to complete tightening is calculated based on the stiffness (k) of the joint after snug.

* * * * *